(12) United States Patent
Imanishi et al.

(10) Patent No.: US 8,245,309 B2
(45) Date of Patent: Aug. 14, 2012

(54) CONTENT VIEWING SYSTEM, CONTENT VIEWING APPARATUS, AND VIEWING APPROVAL APPARATUS

(75) Inventors: Masayuki Imanishi, Kanagawa (JP); Koichi Ogasawara, Kanagawa (JP)

(73) Assignee: Sony Corporation, Tokyo (JP)

( * ) Notice: Subject to any disclaimer, the term of this patent is extended or adjusted under 35 U.S.C. 154(b) by 928 days.

(21) Appl. No.: 12/141,211

(22) Filed: Jun. 18, 2008

(65) Prior Publication Data
US 2008/0320558 A1    Dec. 25, 2008

(51) Int. Cl.
*H04L 29/06*    (2006.01)
(52) U.S. Cl. ............... 726/27; 726/26; 726/29; 725/25
(58) Field of Classification Search ................ None
See application file for complete search history.

(56) References Cited

U.S. PATENT DOCUMENTS

| | | | | |
|---|---|---|---|---|
| 6,948,183 | B1* | 9/2005 | Peterka | 725/25 |
| 2004/0015985 | A1* | 1/2004 | Kweon | 725/30 |
| 2008/0034412 | A1* | 2/2008 | Wahl | 726/8 |

FOREIGN PATENT DOCUMENTS

| | | |
|---|---|---|
| JP | 05-122694 | 5/1993 |
| JP | 2000-175117 (A) | 6/2000 |
| JP | 2007-37142 | 2/2007 |

* cited by examiner

*Primary Examiner* — Ponnoreay Pich
(74) *Attorney, Agent, or Firm* — Finnegan, Henderson, Farabow, Garrett & Dunner, L.L.P.

(57) ABSTRACT

Disclosed herein is a content viewing system including a content viewing apparatus, and a viewing approval apparatus used by a viewing approval party to perform an approval process. The content viewing apparatus includes: a viewing approval requesting section that transmits a viewing approval request to the viewing approval apparatus when it has been determined that approval for viewing of a content is necessary; and a content viewing control section that receives, from the viewing approval apparatus, an approval/disapproval response, and, if the approval/disapproval response indicates that the viewing of the content has been approved, enables the viewing of the content. The viewing approval apparatus includes: an output section that outputs information concerning the viewing approval request; an input section that accepts input of the approval/disapproval response; and an approval/disapproval response notification section that notifies the content viewing apparatus of the approval/disapproval response.

14 Claims, 8 Drawing Sheets

FIG.3

TARO IS TRYING TO VIEW FEE-BASED
BROADCAST WITH HOME TV

| PROGRAM TITLE | FILM "WORLD HUNTER" |
|---|---|
| FEE | 200 YEN |

DO YOU PERMIT?

| PERMIT | REJECT | CALL TARO |

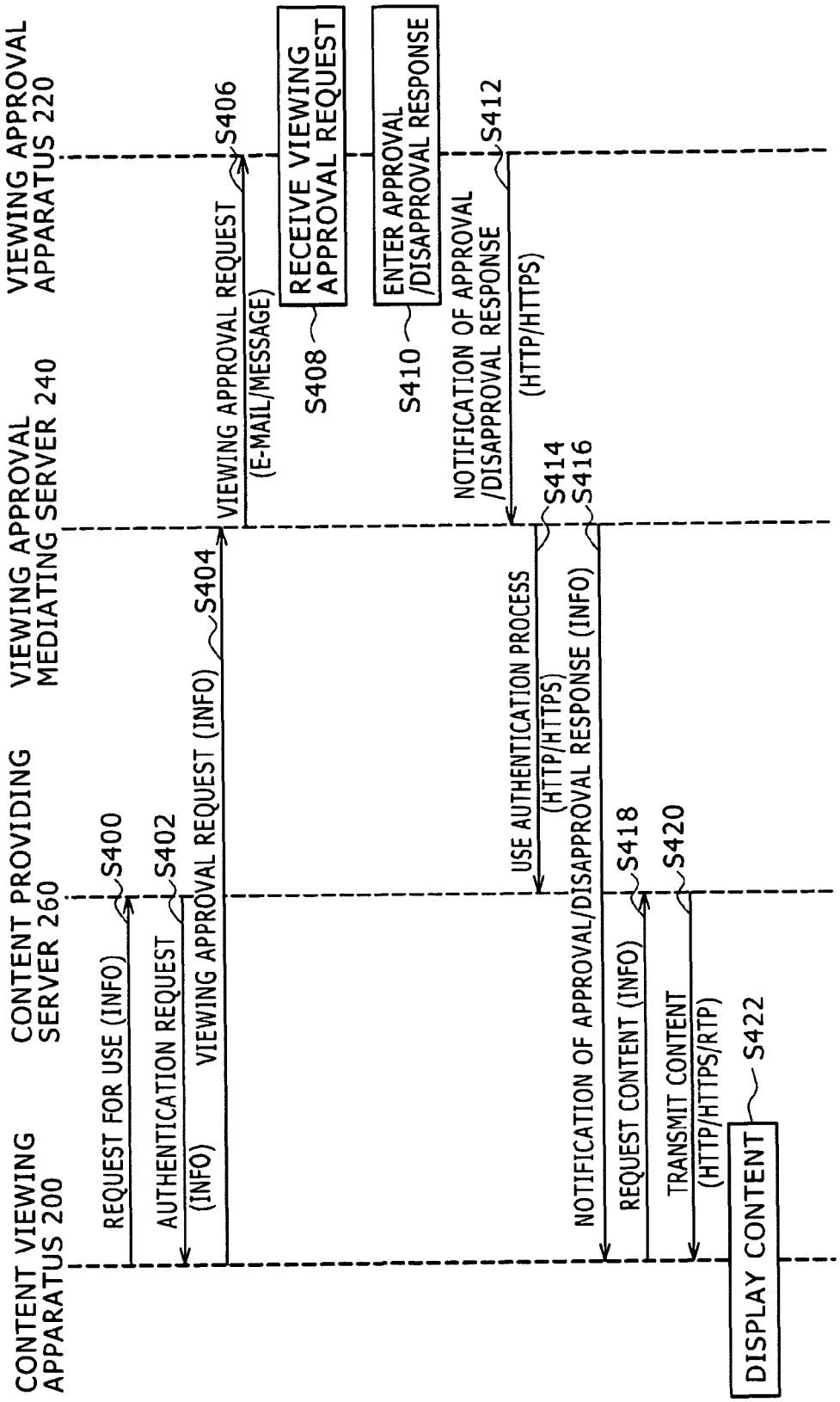

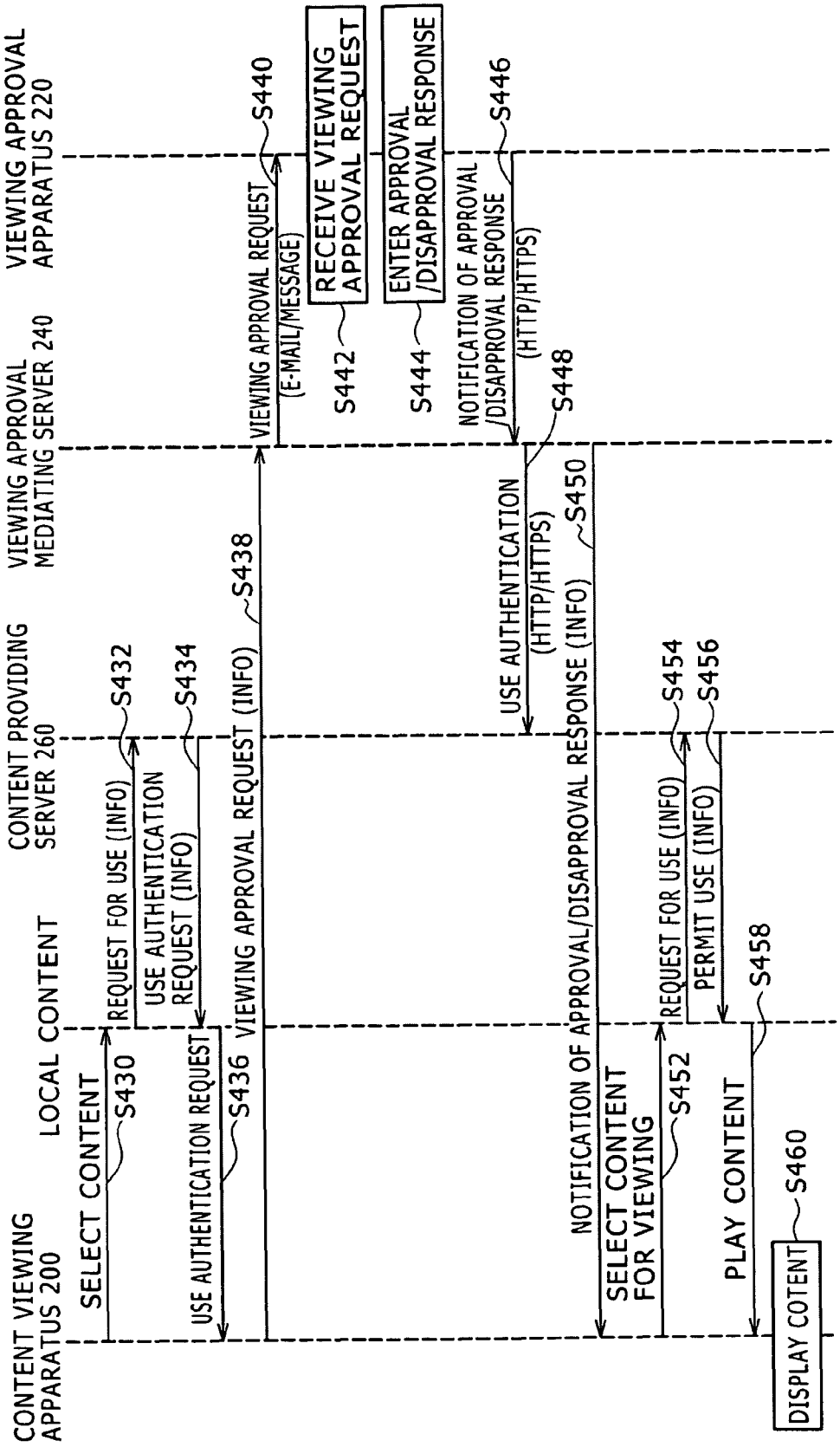

CONTENT VIEWING SYSTEM, CONTENT VIEWING APPARATUS, AND VIEWING APPROVAL APPARATUS

CROSS REFERENCES TO RELATED APPLICATIONS

The present invention contains subject matter related to Japanese Patent Application JP 2007-163182, filed in the Japan Patent Office on Jun. 20, 2007, the entire contents of which being incorporated herein by reference.

BACKGROUND OF THE INVENTION

1. Field of the Invention

The present invention relates to a content viewing system, a content viewing apparatus, and a viewing approval apparatus. In particular, the present invention relates to a content viewing system, a content viewing apparatus, and a viewing approval apparatus which are capable of performing parental control concerning viewing of a content.

2. Description of the Related Art

Television receivers, software products for personal computers, and so on which have a parental control feature have become widespread in recent years. The parental control feature is used to prevent children from viewing harmful television programs, websites, or the like.

The parental control feature regulates access to contents, such as programs or websites, that have been previously defined as harmful. The parental control feature restricts access to the contents using a password or depending on an access time period, for example.

Japanese Patent Laid-open No. Hei 05-122694, for example, discloses a CATV terminal device and a CATV system which are capable of permitting or prohibiting viewing of programs in accordance with parental control ratings, which are set individually for the programs.

Japanese Patent Laid-open No. 2000-175117 discloses a television receiver that is capable of automatic application of parental lock. This television receiver identifies a user by using user identification means, such as means for face recognition using a camera, means for fingerprint recognition, or means for voice recognition. When a request to select a channel has been made, the television receiver determines whether or not the parental lock should be applied, based on information concerning viewing restrictions, which are set for each user and each piece of program data.

SUMMARY OF THE INVENTION

The parental control features as described in Japanese Patent Laid-open No. Hei 05-122694 and 2000-175117 allow specifying in advance whether viewing of particular harmful contents or fee-based contents should be permitted to respective users. These parental control features in related art, however, do not allow a viewing approval party, such as a parent, to decide whether or not to permit a viewing requesting party, such as a child who desires to view a content, to view the content each time the viewing requesting party performs an operation of selecting a program.

Suppose that each time the viewing requesting party performs the operation of selecting a content, the parental control feature automatically inquires of the viewing approval party whether or not to permit the viewing requesting party to view the content. In this case, even if the viewing approval party is with the viewing requesting party in front of a viewing terminal, the viewing approval party is required to decide whether or not to permit the viewing requesting party to view the content. This might be troublesome. This troublesomeness can be eliminated by allowing the viewing approval party to disable the above automatic inquiry feature when the inquiry is not necessary and enable the automatic inquiry feature when the inquiry is necessary. However, the operation of disabling or enabling the automatic inquiry feature will be cumbersome for the viewing approval party.

The present invention addresses the above-identified, and other problems associated with existing methods and apparatuses, and provides a content viewing system, a content viewing apparatus, and a viewing approval apparatus which allow the viewing approval party, who is far away from the viewing requesting party, to perform the parental control efficiently when the viewing requesting party has made a request to view a given content.

According to one embodiment of the present invention, there is provided a content viewing system including a content viewing apparatus used for viewing a content; and a viewing approval apparatus that is a portable communication apparatus used by a viewing approval party to perform an approval process, the viewing approval party having authority to approve viewing of the content. The content viewing apparatus includes a viewing approval requesting section configured to transmit a viewing approval request to the viewing approval apparatus when it has been determined that approval for the viewing of the content, the viewing of which has been requested, is necessary; and a content viewing control section configured to receive, from the viewing approval apparatus, an approval/disapproval response to the viewing approval request, and, if the approval/disapproval response indicates that the viewing of the content has been approved, enable the viewing of the content. The viewing approval apparatus includes an output section configured to output information concerning the viewing approval request received from the content viewing apparatus; an input section configured to accept input of the approval/disapproval response to the viewing approval request; and an approval/disapproval response notification section configured to notify the content viewing apparatus of the approval/disapproval response inputted via the input section.

According to the above content viewing system, when a minor or the like (i.e., a viewing requesting party) has made a request for viewing a harmful content or a fee-based content, a parent or the like (i.e., the viewing approval party) who is far away from the viewing requesting party is able to permit or prohibit the viewing of the content in response to the viewing request. That is, each time the viewing request is made by the viewing requesting party, the viewing approval party is able to decide whether or not to approve the viewing request.

It may be so arranged that the content viewing apparatus further includes an approval party status acquisition section configured to acquire, from the viewing approval apparatus, an approval party status that indicates whether or not the viewing approval request needs to be made to the viewing approval party; that the viewing approval apparatus further includes an approval party status notification section configured to determine the approval party status based on a current location of the viewing approval apparatus, and notify the content viewing apparatus of the approval party status; and that the viewing approval requesting section of the content viewing apparatus decides whether or not to transmit the viewing approval request, based on the approval party status. In this case, it is possible to recognize a location of the viewing approval party based on the location of the viewing approval apparatus, which is carried by the viewing approval party. Accordingly, it is possible to omit the transmission of the viewing approval request when the viewing approval party is with the viewing requesting party in front of the content viewing apparatus, for example.

Also, the approval party status notification section of the viewing approval apparatus may determine that the viewing approval request does not need to be made to the viewing approval party, if the current location of the viewing approval apparatus is within a predetermined area. For example, the viewing approval apparatus may determine that the viewing approval request does not need to be made to the viewing approval party and notify the content viewing apparatus of this fact, when the current location of the viewing approval apparatus as obtained by a GPS is within a predetermined distance of a house of the viewing approval party where the content viewing apparatus is placed.

Also, it may be so arranged that the approval party status notification section of the viewing approval apparatus provides, to the content viewing apparatus, information representing the current location of the viewing approval apparatus; and that the viewing approval requesting section of the content viewing apparatus decides whether or not to transmit the viewing approval request, based on the information representing the current location of the viewing approval apparatus.

Also, the viewing approval apparatus may further include a voice communication control section configured to transmit, to the content viewing apparatus, a request for starting a session to carry out voice communication with the content viewing apparatus, when the viewing approval request has been received. In this case, the viewing approval apparatus, which has received the viewing approval request, is capable of making a call to the content viewing apparatus, so that the viewing approval party can have a conversation with the viewing requesting party.

Also, it may be so arranged that the content viewing system further includes a location server configured to manage information about locations of the content viewing apparatus and the viewing approval apparatus on a network; that the location server acquires the information about the location of the viewing approval apparatus on the network to forward the viewing approval request received from the content viewing apparatus to the viewing approval apparatus; and that the location server acquires the information about the location of the content viewing apparatus on the network to forward the approval/disapproval response received from the viewing approval apparatus to the content viewing apparatus. In this case, the content viewing apparatus is capable of always recognizing the location of the moving viewing approval apparatus on the network to communicate with the viewing approval apparatus.

Also, it may be so arranged that the content viewing system further includes a viewing approval mediating server configured to mediate a viewing approval process for the content between the content viewing apparatus and the viewing approval apparatus; that upon receipt of the viewing approval request transmitted from the content viewing apparatus, the viewing approval mediating server notifies the viewing approval apparatus of an access destination of a website provided for the viewing approval process; and that the viewing approval apparatus accesses the website by using the access destination to perform the viewing approval process and transmit the approval/disapproval response to the viewing approval mediating server.

Also, when the viewing of the content has been approved in the viewing approval apparatus, the viewing approval mediating server may notify a source that provides the content that the viewing of the content has been approved. In this case, the source that provides the content is capable of recognizing whether the viewing approval has been granted with respect to the viewing request for the content. This enables the source that provides the content to provide the content only when the viewing approval has been granted. Moreover, this eliminates the need for the content viewing apparatus to make a judgment with respect to the viewing approval, or the like.

Also, when the viewing of the content has been approved in the viewing approval apparatus, the viewing approval mediating server may transmit, to the content viewing apparatus, secret information for enabling the viewing of the content. In this case, the content viewing system can be applied not only to the case where the content to be viewed should be provided from a content providing server to the content viewing apparatus via the network, but also to the case where the content to be viewed is a content that has previously been downloaded from the content providing server and stored locally.

According to another embodiment of the present invention, there is provided a content viewing apparatus used for viewing a content, including: a viewing approval requesting section configured to transmit a viewing approval request to a viewing approval apparatus when it has been determined that approval for viewing of the content, the viewing of which has been requested, is necessary, the viewing approval apparatus being a portable communication apparatus used by a viewing approval party to perform an approval process, the viewing approval party having authority to approve the viewing of the content; and a content viewing control section configured to receive, from the viewing approval apparatus, an approval/disapproval response to the viewing approval request, and, if the approval/disapproval response indicates that the viewing of the content has been approved, enable the viewing of the content.

According to the above content viewing apparatus, when the minor or the like (i.e., the viewing requesting party) has made the request for the viewing of the harmful content, the fee-based content, or the like, it is possible to request permission to view the content from the parent or the like (i.e., the viewing approval party) who is far away from the viewing requesting party.

It may be so arranged that the content viewing apparatus further includes an approval party status acquisition section configured to acquire, from the viewing approval apparatus, an approval party status that indicates whether or not the viewing approval request needs to be made to the viewing approval party; and that the viewing approval requesting section decides whether or not to transmit the viewing approval request, based on the acquired approval party status.

Also, the viewing approval requesting section may receive, from the viewing approval apparatus, information representing a current location of the viewing approval apparatus, and, if the current location of the viewing approval apparatus is within a predetermined area, does not transmit the viewing approval request.

Also, the content viewing apparatus may further include a voice communication control section configured to receive, from the viewing approval apparatus, a request for starting a voice communication session, and control voice communication performed between the content viewing apparatus and the viewing approval apparatus.

According to yet another embodiment of the present invention, there is provided a viewing approval apparatus that is a portable communication apparatus used by a viewing approval party to perform an approval process, the viewing approval party having authority to approve viewing of a content, the viewing approval apparatus including: an output section configured to output information concerning a viewing approval request with respect to a given content, the viewing approval request being received from a content viewing apparatus used for viewing the content; an input section configured to accept input of an approval/disapproval response to the viewing approval request; and an approval/disapproval response notification section configured to notify the content viewing apparatus of the approval/disapproval response inputted via the input section.

According to the above viewing approval apparatus, when the minor or the like (i.e., the viewing requesting party) has made the request for the viewing of the harmful content, the fee-based content, or the like, the parent or the like (i.e., the viewing approval party) who is far away from the viewing requesting party is able to permit or prohibit the viewing of the content in response to the viewing request. That is, each time the viewing request is made by the viewing requesting party, the viewing approval party is able to decide whether or not to approve the viewing request.

The viewing approval apparatus may further include an approval party status notification section configured to determine an approval party status that indicates whether or not the viewing approval request needs to be made to the viewing approval party based on a current location of the viewing approval apparatus, and notify the content viewing apparatus of the approval party status.

Also, the approval party status notification section may determine that the viewing approval request does not need to be made to the viewing approval party, if the current location of the viewing approval apparatus is within a predetermined area.

Also, the approval party status notification section may notify the content viewing apparatus of the current location of the viewing approval apparatus.

Also, the viewing approval apparatus may further include a voice communication control section configured to transmit, to the content viewing apparatus, a request for starting a session to carry out voice communication with the content viewing apparatus, when the viewing approval request has been received.

As described above, according to the above-described embodiments of the present invention, when the viewing requesting party has made a request for the viewing of a given content, the viewing approval party who is far away from the viewing requesting party is able to perform the approval process efficiently.

BRIEF DESCRIPTION OF THE DRAWINGS

FIG. 3 shows an exemplary screen for viewing approval as displayed on a display section of the viewing approval apparatus;

FIG. 7 is a sequence diagram illustrating an exemplary flow of a procedure performed in the content viewing system according to the second embodiment; and FIG. 8 is a sequence diagram illustrating another exemplary flow of a procedure performed in the content viewing system according to the second embodiment.

DETAILED DESCRIPTION OF THE PREFERRED EMBODIMENTS

Figure 1:
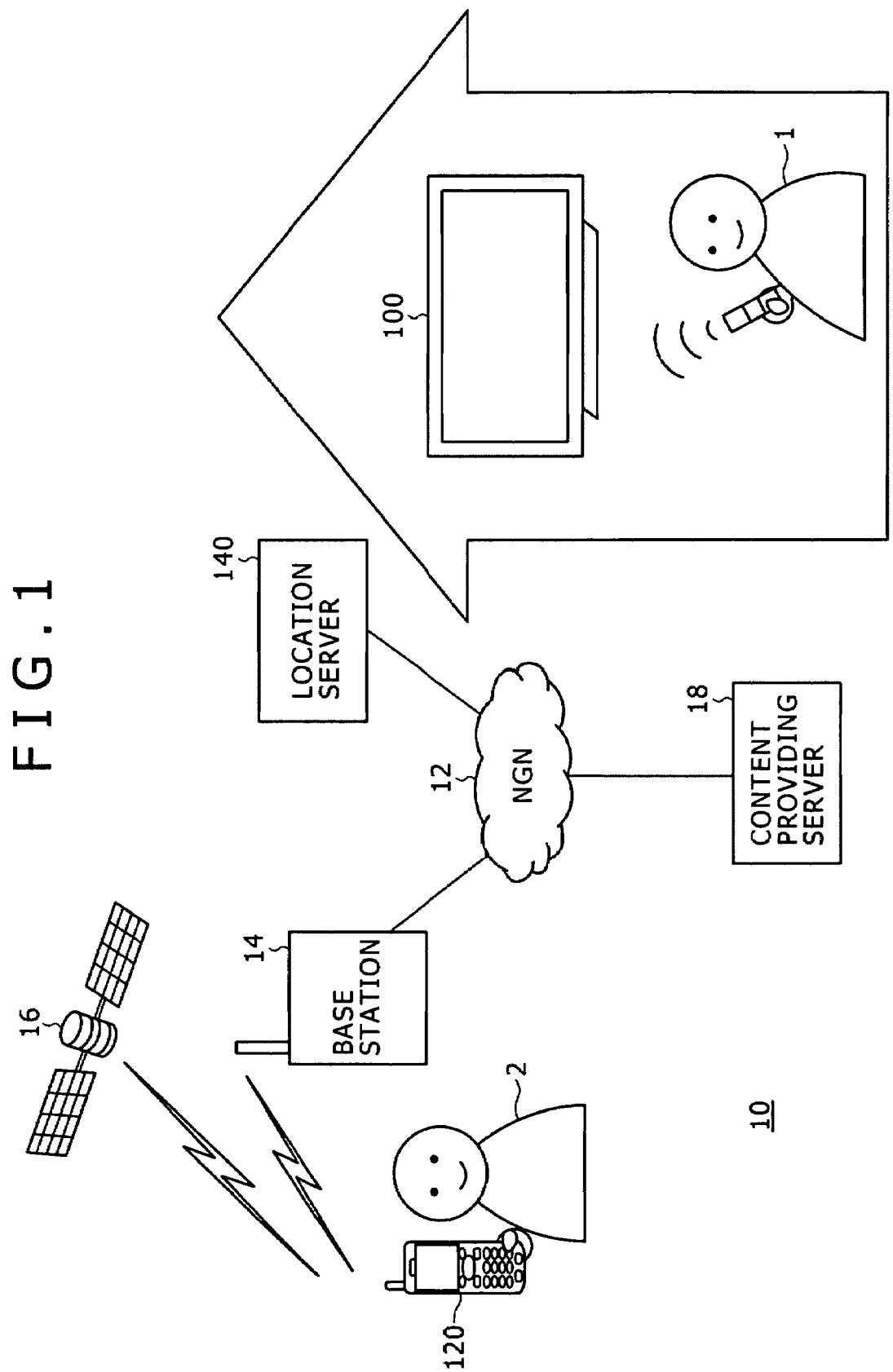
FIG. 1 is a schematic block diagram illustrating the configuration of a content viewing system according to a first embodiment of the present invention.

Hereinafter, preferred embodiments of the present invention will be described in detail with reference to the accompanying drawings. Note that, in the present specification and the accompanying drawings, like reference numerals designate like parts, and thus redundant descriptions will be omitted.

First Embodiment

Figure 2:
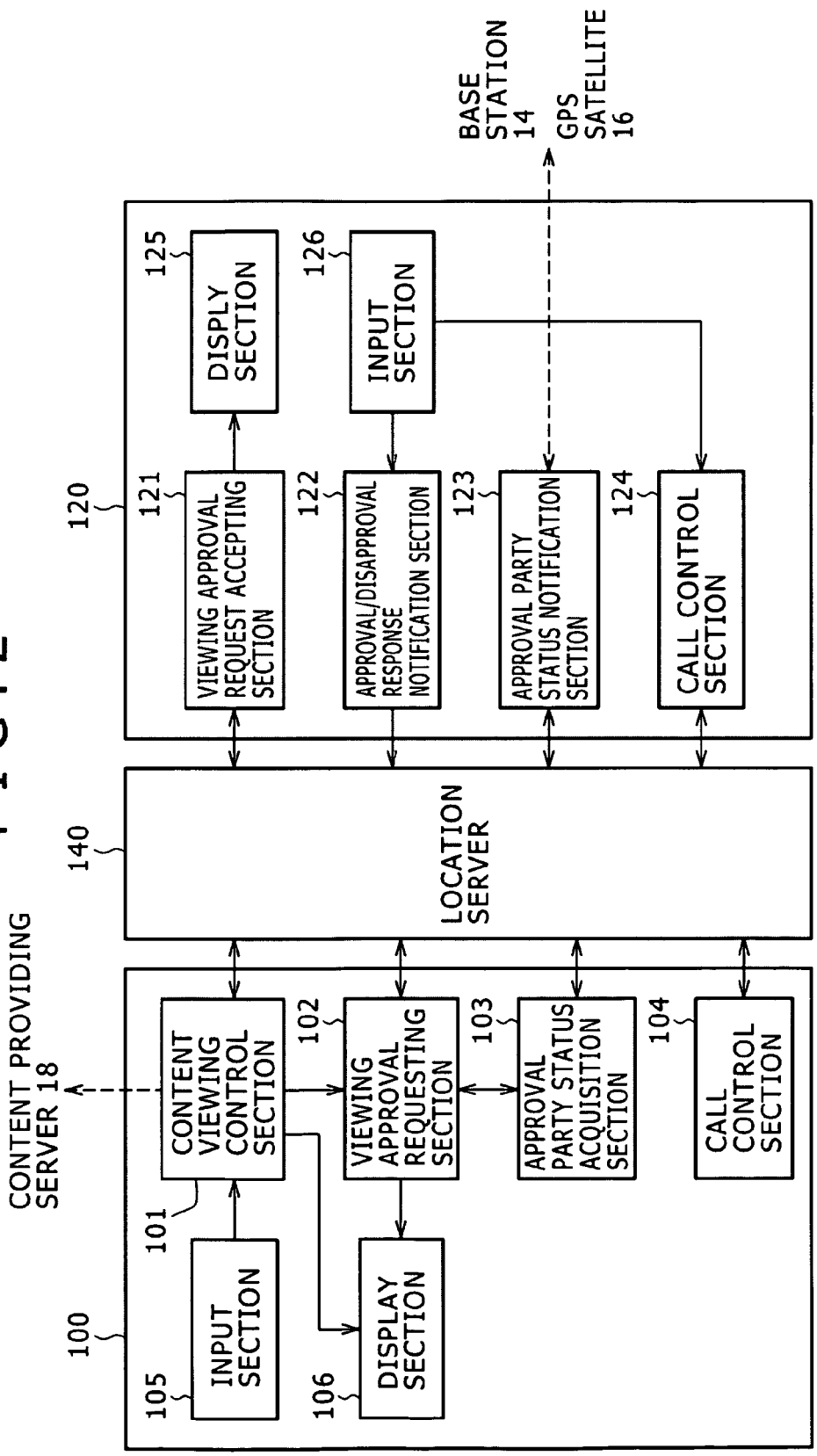
FIG. 2 is a schematic block diagram illustrating the structures of a content viewing apparatus and a viewing approval apparatus according to the first embodiment.

First, with reference to FIGS. 1 and 2, a content viewing system 10 according to a first embodiment of the present invention will be described below. FIG. 1 is a schematic block diagram illustrating the configuration of the content viewing system 10 according to the first embodiment of the present invention. FIG. 2 is a schematic block diagram illustrating the structures of a content viewing apparatus 100 and a viewing approval apparatus 120.

The content viewing system 10 according to the first embodiment is a system for achieving parental control in the content viewing apparatus 100, which is used for viewing of contents. As shown in FIG. 1, the content viewing system 10 according to the present embodiment includes the content viewing apparatus 100, the viewing approval apparatus 120, and a location server 140.

The content viewing system 10 according to the present embodiment is characterized in that when a content defined as harmful, a fee-based content, or the like is viewed with the content viewing apparatus 100, a viewing approval request is transmitted to the viewing approval apparatus 120, and an approval process is performed in the viewing approval apparatus 120 to enable the viewing of the content.

Note that a person who operates the content viewing apparatus 100 to view the content will be hereinafter referred to as a "viewing requesting party" (e.g., a viewing requesting party 1 as shown in FIG. 1), whereas a person who operates the viewing approval apparatus 120 to perform a viewing approval process concerning the viewing of the content by the viewing requesting party will be hereinafter referred to as a "viewing approval party" (e.g., a viewing approval party 2 as shown in FIG. 1). An example of the viewing requesting party is a minor or the like who needs permission from the viewing approval party to view a particular content. An example of the viewing approval party is a parent or the like of the minor who is the viewing requesting party. The viewing approval party has authority to perm-t the viewing requesting party to view the content.

In the content viewing system 10 according to the present embodiment, the content viewing apparatus 100, the viewing approval apparatus 120, and the location server 140 are connected to a next generation network (NGN) 12, and communicate with one another using the Session Initiation Protocol (SIP).

The content viewing apparatus 100 and the viewing approval apparatus 120 exchange SIP messages via the location server 140. The location server 140 manages information concerning the content viewing apparatus 100 and the viewing approval apparatus 120, in particular, information about locations thereof on the network. If the location server 140 receives, from the content viewing apparatus 100, an IP message for the viewing approval apparatus 120, the location server 140 inquires the information (e.g., an IP address) about the location of the viewing approval apparatus 120 on the network, and forwards the SIP message to the viewing approval apparatus 120 using this location information.

Next, the structure of each apparatus will be described below with reference to FIGS. 1 and 2.

(Content Viewing Apparatus 100)

The content viewing apparatus 100 has a function of requesting, of a content providing server 18, various types of contents such as music or video contents and outputting the contents via a display, a loudspeaker, or the like. Examples of the content viewing apparatus 100 include a television receiver, a DVD player, a personal computer, and a home game machine. It is assumed herein that the content viewing apparatus 100 is placed in a house of a viewer, for example. However, the content viewing apparatus 100 may be a portable information processing apparatus, such as a cellular phone, a personal digital assistant (PDA), a notebook computer, a portable game machine, or a portable television receiver.

Examples of the content providing server 18 include a program broadcasting server of a television broadcaster, and a content delivery server of a service company that offers a multicast/unicast delivery service for video contents. In response to a viewing request (i.e., a request for viewing a content) transmitted from the content viewing apparatus 100, the content providing server 18 transmits the requested content to the content viewing apparatus 100.

The term "content" as used herein refers to a document, an image, an audio, a video, or information composed of any combination of them, which are represented by digital data and provided by the content providing server 18. Examples of the contents include: video contents, such as television programs or films, delivered by multicast/unicast delivery; and Web data, such as HTML documents, images, or videos, provided on the Internet.

Note that existent technologies can be applied to allow the content viewing apparatus 100 to have a capability to implement viewing of such contents, and descriptions thereof are omitted here.

As shown in FIG. 2, the content viewing apparatus 100 includes a content viewing control section 101, a viewing approval requesting section 102, an approval party status acquisition section 103, a call control section 104, an input section 105, and a display section 106. These sections will now be described below.

(Content Viewing Control Section 101)

The content viewing control section 101 is a functional part configured to determine, when the viewing requesting party has performed an operation for requesting the viewing of a content, whether viewing approval for the content is necessary, and thereby controls the viewing of the content. If the content viewing control section 101 determines that the viewing approval is necessary, the content viewing control section 101 notifies the viewing approval requesting section 102 of this fact to allow the viewing approval requesting section 102 to issue a viewing approval request.

If the viewing request is made for a certain content, the content viewing control section 101 determines whether approval for the viewing of this content is necessary. This determination is performed using information concerning the viewing requesting party, information concerning a genre of the content, information concerning viewing restrictions, and so on, for example. For example, suppose that the age of the viewing requesting party is 14 years, and the viewing request is made for a program that is accompanied with information "Permission is required for viewers aged under 15 years". In this case, the content viewing control section 101 will determine that the viewing approval is necessary. Suppose that a setting "Permission is required for viewing of fee-based broadcasts" is effective for the viewing requesting party. In this case, the content viewing control section 101 will determine that the viewing approval is necessary if the content is a fee-based broadcast.

Also, the content viewing control section 101 receives, from the viewing approval apparatus 120, an INFO method that indicates whether a viewing approval process has been performed. This INFO method is transmitted from the viewing approval apparatus 120 as a response to the viewing approval request transmitted by the viewing approval requesting section 102. The content viewing control section 101 analyzes a content of the received INFO method. If it is found that permission for the viewing of the content has been granted, the content viewing control section 101 requests the content providing server 18 to transmit the content.

Meanwhile, if it is found that the permission for the viewing of the content has not been granted, the content viewing control section 101 may allow the display section 106 to display a message indicating that the permission for the viewing of the content has not been granted.

(Viewing Approval Requesting Section 102)

The viewing approval requesting section 102 is a functional part for issuing the viewing approval request to the viewing approval apparatus 120 when the content viewing control section 101 has determined that the viewing approval is necessary. The viewing approval requesting section 102 transmits the viewing approval request to the viewing approval apparatus 120, which has previously been registered as a receiver of the viewing approval request. The viewing approval request may be transmitted by using a SIP NOTIFY method. Examples of information that is provided using the NOTIFY method include: information concerning the viewing requesting party who has made the viewing request; information concerning the content, such as a name or type of the content, or a fee for the viewing of the content; and information concerning the content viewing terminal that has transmitted the viewing approval request.

In addition, the viewing approval requesting section 102 may allow the display section 106, such as the display, to display a selection screen to allow the viewer to decide whether or not to transmit the viewing approval request to the viewing approval apparatus 120. In this case, if the viewer decides on transmitting the viewing approval request by using the input section 105, the viewing approval requesting section 102 transmits the viewing approval request to the viewing approval apparatus 120.

Before transmitting the viewing approval request to the viewing approval apparatus 120, the viewing approval requesting section 102 may inquire of the approval party status acquisition section 103 the status of the approval party, who is supposed to decide whether or not to grant the viewing approval. Also, based on information concerning the status of the approval party, notification of which has been previously provided by the approval party status acquisition section 103, it may be determined that the viewing approval request should not be transmitted to the viewing approval apparatus 120. Details of a process of checking for the status of the approval party will be described below.

(Approval Party Status Acquisition Section 103)

The approval party status acquisition section 103 is a functional part for acquiring a current status (i.e., the approval party status) of the viewing approval party 2, who is carrying the viewing approval apparatus 120. Here, the current status of the viewing approval party 2 refers to whether or not the viewing approval party 2 currently needs to perform the viewing approval process using the viewing approval apparatus 120. Specifically, for example, in the case where the viewing approval party 2 is out of his or her house, where the content viewing apparatus 100 is placed, it may be determined that the viewing approval party 2 needs to perform the viewing approval process. Meanwhile, in the case where the viewing approval party 2 is in his or her house and is in front of the content viewing apparatus 100 together with the viewing requesting party 1, it may be determined that the viewing approval party 2 does not need to perform the viewing approval process.

The approval party status can be determined mainly based on location information of the viewing approval apparatus 120. The approval party status acquisition section 103 may acquire the location information of the viewing approval apparatus 120 from the viewing approval apparatus 120 to determine the approval party status (e.g., whether the viewing approval apparatus 120 is inside or outside the house of the viewing approval party 2). The approval party status may be determined by the viewing approval apparatus 120 and then notified to the approval party status acquisition section 103. In other words, the viewing approval apparatus 120 may determine whether or not the viewing approval is necessary. Alternatively, the viewing approval party 2 may enter information about the approval party status in the viewing approval apparatus 120, and then this information may be provided to the approval party status acquisition section 103.

The approval party status acquisition section 103 may register itself at the viewing approval apparatus 120 by transmitting a SUBSCRIBE method to the viewing approval apparatus 120 in advance, for example, so that the approval party status acquisition section 103 will be notified by the viewing approval apparatus 120 of the location information thereof or the approval party status. As a result, each time the status of the viewing approval apparatus 120 is changed, the approval party status acquisition section 103 is able to receive, from the viewing approval apparatus 120, information about a new status of the viewing approval apparatus 120.

(Call Control Section 104)

The call control section 104 is a functional part for performing control for performing telephone communication between the content viewing apparatus 100 and the viewing approval apparatus 120. The call control section 104 receives a calling request (an INVITE method) from the viewing approval apparatus 120, and, in response to the calling request, notifies the viewing requesting party 1 of arrival of a telephone call by, for example, making a ringtone or displaying a message indicating the arrival of the telephone call on the display section 106. A handset (not shown) or the like can be connected to the content viewing apparatus 100 so that the viewing requesting party 1 can carry out a telephone conversation. If the viewing requesting party 1 answers the call, a session is established between the content viewing apparatus 100 and the viewing approval apparatus 120, so that the telephone conversation becomes possible therebetween.

(Input Section 105)

The input section 105 is a functional part to which an input signal is inputted. The input signal represents an operation performed on an input interface provided for the content viewing apparatus 100, such as a button, a switch, a mouse, a keyboard, a remote control, or the like. The input section 105 outputs the inputted input signal to the content viewing control section 101 or the like.

(Display Section 106)

The display section 106 is an output unit such as the display. An image of the content being viewed, a message for giving notification to the viewing requesting party 1, and so on are displayed on the display section 106.

The structure of the content viewing apparatus 100 according to the present embodiment has been described above. Note that the content viewing control section 101, the viewing approval requesting section 102, the approval party status acquisition section 103, and the call control section 104 can be realized either by installing a software program for performing the functions of these sections onto the content viewing apparatus 100, or by dedicated hardware. Also note that the above software program may be stored in a computer-readable storage medium and read therefrom for execution. Alternatively, the above software program may be provided to the content viewing apparatus 100 via a network or the like.

(Viewing Approval Apparatus 120)

The viewing approval apparatus 120 is used by the viewing approval party 2 to respond to the viewing approval request transmitted from the content viewing apparatus 100, by granting or not granting the approval for the viewing of the content. The viewing approval apparatus 120 can be carried by the viewing approval party 2. The viewing approval apparatus 120 may be an information processing apparatus such as a cellular phone, a portable information terminal, or a notebook computer, for example.

In the present embodiment, it is assumed that the viewing approval apparatus 120 is the cellular phone, and that the viewing approval apparatus 120 is connected to the NGN 12 via a base station 14, which is installed by a cellular phone company. The viewing approval apparatus 120 is capable of obtaining information concerning a current location of the viewing approval apparatus 120 from information that is acquired from the base station 14 or a GPS satellite 16.

As shown in FIG. 2, the viewing approval apparatus 120 includes a viewing approval request accepting section 121, an approval/disapproval response notification section 122, an approval party status notification section 123, a call control section 124, a display section 125, and an input section 126. Details of these sections will now be described below.

(Viewing Approval Request Accepting Section 121)

The viewing approval request accepting section 121 is a functional part for receiving the viewing approval request from the content viewing apparatus 100, and notifying the viewing approval party 2 of receipt of the viewing approval request.

The viewing approval request accepting section 121 registers information concerning itself to the content viewing apparatus 100 in advance, by transmitting a SUBSCRIBE method to the content viewing apparatus 100, for example, in order to receive the viewing approval request from the content viewing apparatus 100. As a result, if a need arises to transmit the viewing approval request, the content viewing apparatus 100 is able to transmit the viewing approval request to the viewing approval apparatus 120, which is carried by the viewing approval party 2.

The viewing approval request transmitted by the content viewing apparatus 100 may be transmitted by using the SIP NOTIFY method. For example, the viewing approval request transmitted may include: the information concerning the viewing requesting party 1 who has made the viewing request; the information concerning the content, such as the name or type of the content, or the fee for the viewing of the content; the information concerning the content viewing terminal that has transmitted the viewing approval request; and so on.

Upon receipt of the viewing approval request from the content viewing apparatus 100, the viewing approval request accepting section 121 allows the display section 125 to display a screen as shown in FIG. 3. With the screen as shown in FIG. 3, the viewing approval party 2 is able to select "PERMIT" or "REJECT" using the input section 126, thereby answering the content viewing apparatus 100 as to whether or not to permit the viewing of the content. In addition, the viewing approval party 2 is able to select "CALL TARO" to make a telephone call to the content viewing apparatus 100.

(Approval/Disapproval Response Notification Section 122)

The approval/disapproval response notification section 122 is a functional part for notifying the content viewing apparatus 100 of a response (hereinafter referred to as an "approval/disapproval response" as appropriate) by the viewing approval party 2 to the viewing approval request received by the viewing approval request accepting section 121.

The approval/disapproval response notification section 122 receives, from the input section 126, the response by the viewing approval party 2, who has viewed the notification screen (see FIG. 3) displayed on the display section 125 in response to the viewing approval request, and notifies the content viewing apparatus 100 of the response. In the case of the notification screen as shown in FIG. 3, for example, the viewing approval party 2 is able to input, via the input section 126, an input signal that indicates that "PERMIT", "REJECT", or "CALL TARO" has been selected. In the case where "PERMIT" or "REJECT" has been selected of the above three options, the value selected is inputted to the approval/disapproval response notification section 122, and the approval/disapproval response notification section 122 notifies the content viewing apparatus 100 of a content of the inputted value by using an INFO message or the like.

(Approval Party Status Notification Section 123)

The approval party status notification section 123 is a functional part for notifying the content viewing apparatus 100 of the current status (i.e., the approval party status) of the viewing approval party 2 who is carrying the viewing approval apparatus 120. As noted previously, the approval party status refers to whether or not the viewing approval party 2 currently needs to perform the viewing approval process using the viewing approval apparatus 120. Specifically, the approval party status refers to a case where the viewing approval party 2 is inside his or her house where the content viewing apparatus 100 is placed, and so on, for example.

The approval party status notification section 123 acquires, from the base station 14 or the GPS satellite 16, the information concerning the current location of the viewing approval apparatus 120 (e.g., the longitude and latitude of the current location of the viewing approval apparatus 120) to determine whether or not the current location thereof is within a predetermined area. Note here that when the viewing approval apparatus 120 is within the predetermined area, it is determined that the viewing approval is unnecessary. Thereafter, the approval party status notification section 123 notifies the content viewing apparatus 100, which is registered thereat, of a result of the above determination by using the NOTIFY method or the like.

Alternatively, the approval party status notification section 123 may transmit the location information of the viewing approval apparatus 120, which has been received from the base station 14 or the GPS satellite 16, to the content viewing apparatus 100. In this case, whether or not the viewing approval is necessary is determined on the part of the content viewing apparatus 100.

(Call Control Section 124)

The call control section 124 is a functional part for performing control for performing the telephone communication between the content viewing apparatus 100 and the viewing approval apparatus 120. When an instruction to make the telephone call to the content viewing apparatus 100 has been inputted from the input section 126, the call control section 124 transmits a calling request message (an INVITE method) to the content viewing apparatus 100. Thereafter, a notification as to whether the calling request has been answered successfully is provided, and in the case where the calling request has been answered successfully, the session is established between the content viewing apparatus 100 and the viewing approval apparatus 120, so that the telephone conversation becomes possible therebetween.

(Display Section 125)

The display section 125 is an output unit such as a display. The message (see FIG. 3) for notifying the viewing approval party 2 of the receipt of the viewing approval request from the content viewing apparatus 100, or the like is displayed on the display section 125.

(Input Section 126)

The input section 126 is a functional part to which an input signal is inputted. The input signal represents an operation performed on an input interface provided for the viewing approval apparatus 120, such as a button, a switch, a mouse, a keyboard, a remote control, or the like. The input section 126 outputs the inputted input signal to the approval/disapproval response notification section 122 or the call control section 124.

The structure of the viewing approval apparatus 120 has been described above. Note that the viewing approval request accepting section 121, the approval/disapproval response notification section 122, the approval party status notification section 123, and the call control section 124 can be realized either by installing a software program for performing the functions of these sections onto the viewing approval apparatus 120, or by dedicated hardware. Also note that the above software program may be stored in a computer-readable storage medium and read therefrom for execution. Alternatively, the above software program may be provided to the viewing approval apparatus 120 via a network or the like.

(Location Server 140)

The location server 140 is a server for managing the information concerning the content viewing apparatus 100 and the viewing approval apparatus 120, and relaying the communication between the content viewing apparatus 100 and the viewing approval apparatus 120. When data has been transmitted from the content viewing apparatus 100 to the viewing approval apparatus 120, for example, the location server 140 obtains the location (i.e., the IP address) of the viewing approval apparatus 120 on the network by using a destination address included in a header of the transmitted data as a key, and forwards the transmitted data to the viewing approval apparatus 120. Data transmission from the viewing approval apparatus 120 to the content viewing apparatus 100 is also performed in a similar manner.

Because of the above intermediation of the location server 140, the content viewing apparatus 100 is able to communicate with the viewing approval apparatus 120, which may move, as the location of the viewing approval apparatus 120 on the network can be obtained by the location server 140.

The structure of the content viewing system 10 according to the present embodiment has been described above.

Figure 4:
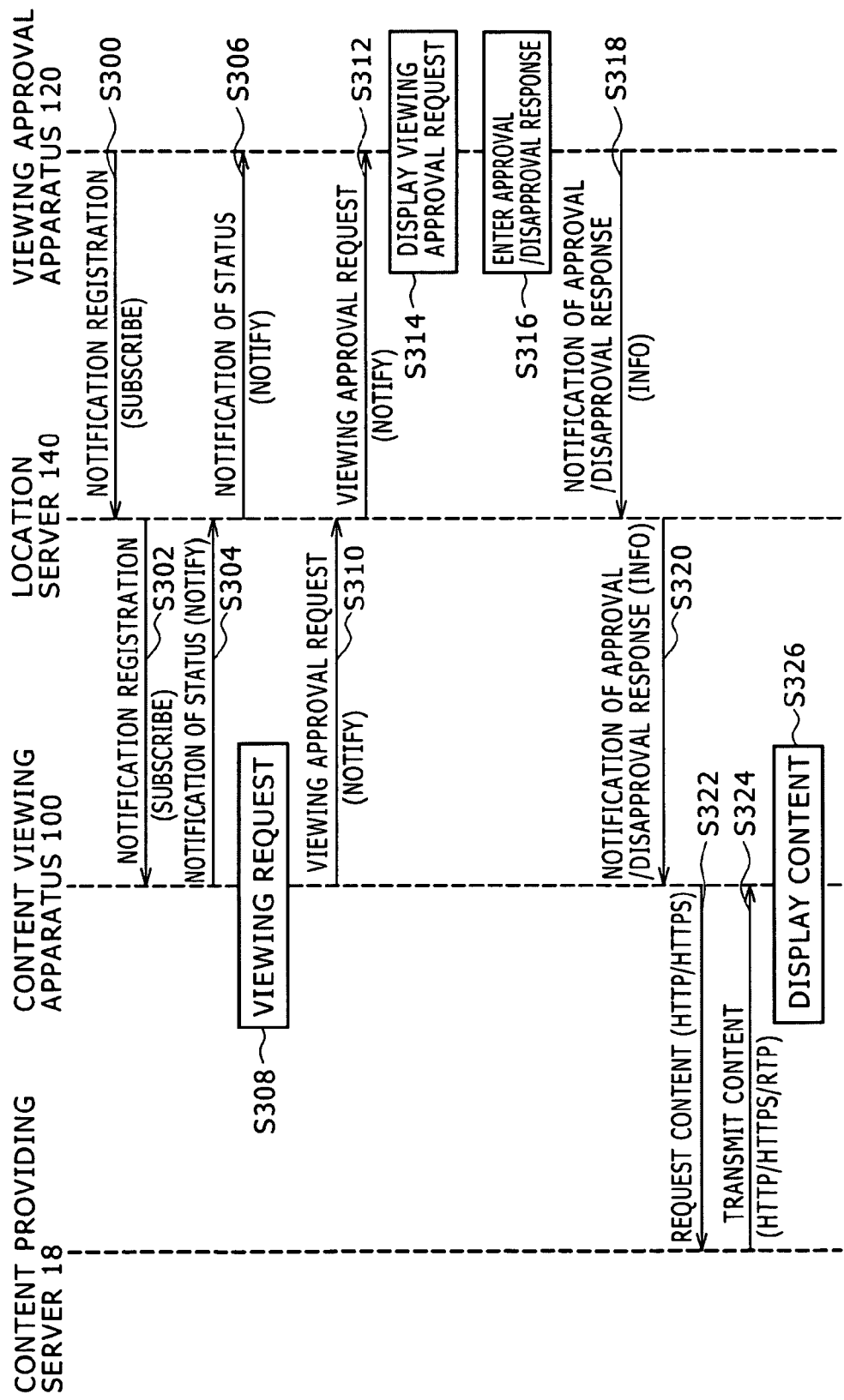
FIG. 4 is a sequence diagram illustrating an exemplary flow of a procedure performed in the content viewing system according to the first embodiment.

Next, with reference to FIG. 4, a flow of a procedure performed in the content viewing system 10 according to the present embodiment will now be described below. FIG. 4 is a sequence diagram illustrating an exemplary flow of the viewing approval process performed in the content viewing system 10.

Steps S300, S302, S304, and S306 as shown in FIG. 4 correspond to a prior registration process performed for the viewing approval apparatus 120 to receive the viewing approval request from the content viewing apparatus 100.

First, at step S300, the viewing approval request accepting section 121 of the viewing approval apparatus 120 transmits the SUBSCRIBE method for the registration of the information concerning itself in order to receive the viewing approval request from the content viewing apparatus 100. The SUBSCRIBE method is first transmitted to the location server 140, and at step S302, the SUBSCRIBE method is forwarded from the location server 140 to the content viewing apparatus 100.

Next, at step S304, the content viewing apparatus 100 transmits the NOTIFY method to the viewing approval apparatus 120, which has transmitted the SUBSCRIBE method, to notify the viewing approval apparatus 120 of a current status. At this time, similarly to steps S300 and S302, the NOTIFY method is first transmitted to the location server 140, and then at step 306, the NOTIFY method is forwarded from the location server 140 to the viewing approval apparatus 120.

As a result of the above processes, the prior registration process, i.e., a process of registering the viewing approval apparatus 120 at the content viewing apparatus 100 in advance, is completed, so that the viewing approval apparatus 120 becomes able to receive the viewing approval request from the content viewing apparatus 100.

Thereafter, at step S308, in the content viewing apparatus 100, the viewing request is made for a certain content, and the content viewing control section 101 of the content viewing apparatus 100 issues the viewing approval request. At step S310, the viewing approval requesting section 102 transmits the NOTIFY method to the viewing approval apparatus 120, thereby making the viewing approval request. The viewing approval request may include, for example: an ID of the viewing requesting party who has made the viewing request; attribute information concerning the content for which the viewing request has been made; and so on. At step S312, the NOTIFY method is transmitted to the viewing approval apparatus 120 via the location server 140.

At step S314, the viewing approval request accepting section 121, which receives the viewing approval request from the content viewing apparatus 100, displays the message that notifies the viewing approval party 2 of occurrence of the viewing request. As shown in FIG. 3, the message may include, for example: a name of a person who has made the viewing request; a name of the content for which the viewing request has been made; the fee for the viewing of the content; and so on.

Next, at step S316, the approval/disapproval response to the viewing approval request is inputted to the approval/disapproval response notification section 122 of the viewing approval apparatus 120. Here, it is assumed that "PERMIT" is selected in the message as shown in FIG. 3, and the corresponding value is inputted to the approval/disapproval response notification section 122 via the input section 126. At steps S318 and S320, the approval/disapproval response notification section 122 transmits, to the content viewing apparatus 100 via the location server 140, the INFO method that indicates that the viewing of the content has been permitted.

Next, at step S322, the viewing approval requesting section 102 analyzes the received INFO method to determine that the viewing of the content has been permitted, and requests the content from the content providing server 18.

In response to the request for the content from the content viewing apparatus 100, the content providing server 18 transmits the content at step S324. The content viewing apparatus 100 receives the content from the content providing server 18, and allows the display section 106 to display the played video and so on of the received content at step S326.

As described above, each time the viewing requesting party 1 makes the viewing request for a content, the content viewing apparatus 100 transmits the viewing approval request to the viewing approval apparatus 120, and the viewing approval party 2, who is carrying the viewing approval apparatus 120, is able to decide whether or not to permit the viewing of the content. Therefore, the parental control can be performed more appropriately compared to the case where the viewing of the content is automatically permitted or prohibited depending on the viewing requesting party 1, who is supposed to view the content, and an attribute of the content.

Figure 5:
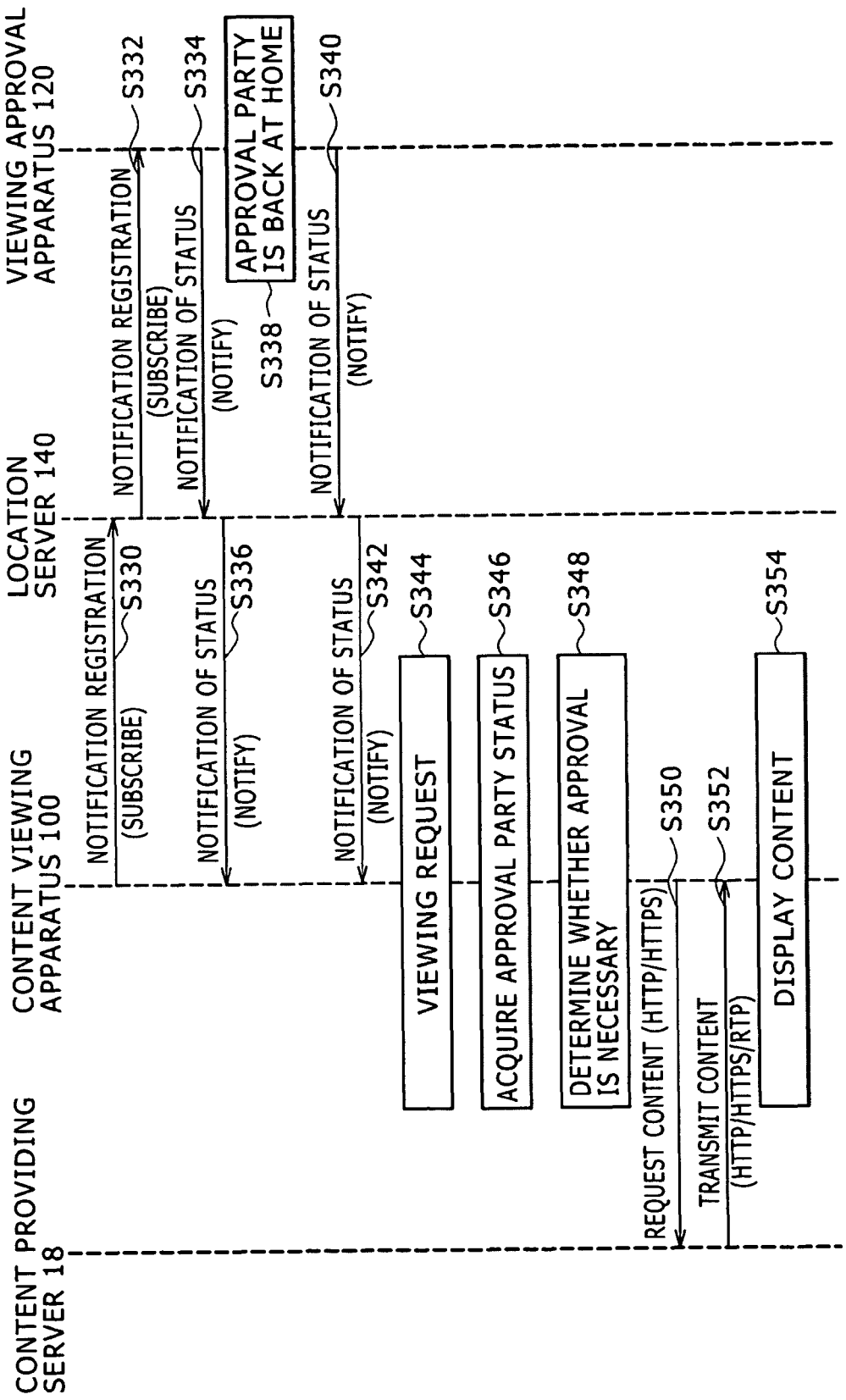
FIG. 5 is a sequence diagram illustrating another exemplary flow of a procedure performed in the content viewing system according to the first embodiment.

Next, another exemplary procedure performed in the content viewing system 10 according to the present embodiment will now be described below with reference to FIG. 5. FIG. 5 is a sequence diagram illustrating another exemplary flow of the viewing approval process performed in the content viewing system 10.

The exemplary flow of the viewing approval process as shown in FIG. 5 differs from the exemplary flow of the viewing approval process as shown in FIG. 4 in that, before making the viewing approval request, the content viewing apparatus 100 determines whether or not to make the viewing approval request based on the approval party status acquired from the viewing approval apparatus 120.

Steps S330, S332, S334, and S336 as shown in FIG. 5 correspond to a prior registration process performed for the content viewing apparatus 100 to receive the approval party status from the viewing approval apparatus 120.

First, at step S330, the approval party status acquisition section 103 of the content viewing apparatus 100 transmits the SUBSCRIBE method to register information concerning itself, in order to receive notification about the approval party status from the viewing approval apparatus 120. The SUBSCRIBE method transmitted is forwarded by the location server 140 to the viewing approval apparatus 120 at step S342.

Next, at step S334, the approval party status notification section 123 of the viewing approval apparatus 120 notifies the content viewing apparatus 100, which has been registered thereat, of the location information of the viewing approval apparatus 120 or the approval party status. The approval party status notification section 123 inquires of the base station 14 or the GPS satellite 16 to acquire the location information of the viewing approval apparatus 120 (e.g., the longitude and latitude of the current location of the viewing approval apparatus 20), and notifies the content viewing apparatus 100 thereof using the NOTIFY method. The NOTIFY method is forwarded by the location server 140 to the content viewing apparatus 100 at step S336.

As a result of the above processes, the content viewing apparatus 100 becomes able to receive the information of the approval party status from the viewing approval apparatus 120.

It is assumed here that, at step S338, the viewing approval party 2, who is carrying the viewing approval apparatus 120, moves and is now in his or her house, where the content viewing apparatus 100 is placed. The approval party status notification section 123 of the viewing approval apparatus 120 receives, from the base station 14 or the GPS satellite 16, the information concerning the current location of the viewing approval apparatus 120 to determine whether or not the current location thereof is within an area that is considered as the inside of his or her house.

If the approval party status notification section 123 determines that the viewing approval party 2 is inside his or her house, the approval party status notification section 123 transmits the NOTIFY method to notify the content viewing apparatus 100 of this fact at step S340. The NOTIFY method is forwarded by the location server 140 to the content viewing apparatus 100 at step S342.

It is assumed here that the viewing request is made in the content viewing apparatus 100 at step S344. At step S346, the viewing approval requesting section 102 of the content viewing apparatus 100 acquires the approval party status from the approval party status acquisition section 103. Alternatively, the viewing approval requesting section 102 may have previously been notified by the approval party status acquisition section 103 of the approval party status. At step S348, based on the information of the approval party status acquired from the approval party status acquisition section 103, the viewing approval requesting section 102 determines that the issuance of the viewing approval request is not necessary because the viewing approval party 2 is inside his or her house.

Accordingly, at step S350, the viewing approval requesting section 102 requests the content from the content providing server 18, without transmitting the viewing approval request to the viewing approval apparatus 120. At step S352, the content providing server 18 transmits the content to the content viewing apparatus 100. At step S354, the display section 106 of the content viewing apparatus 100 displays the content.

As described above, when the viewing approval apparatus 120 is located close to the content viewing apparatus 100, i.e., when the viewing approval party 2 is close to the content viewing apparatus 100, the viewing approval request is not transmitted to the viewing approval apparatus 120 even if the viewing request is made for the content. This eliminates the need for the viewing approval party 2 to perform a cumbersome operation.

The content viewing system 10 according to the first embodiment of the present invention has been described above.

Second Embodiment

Figure 6:
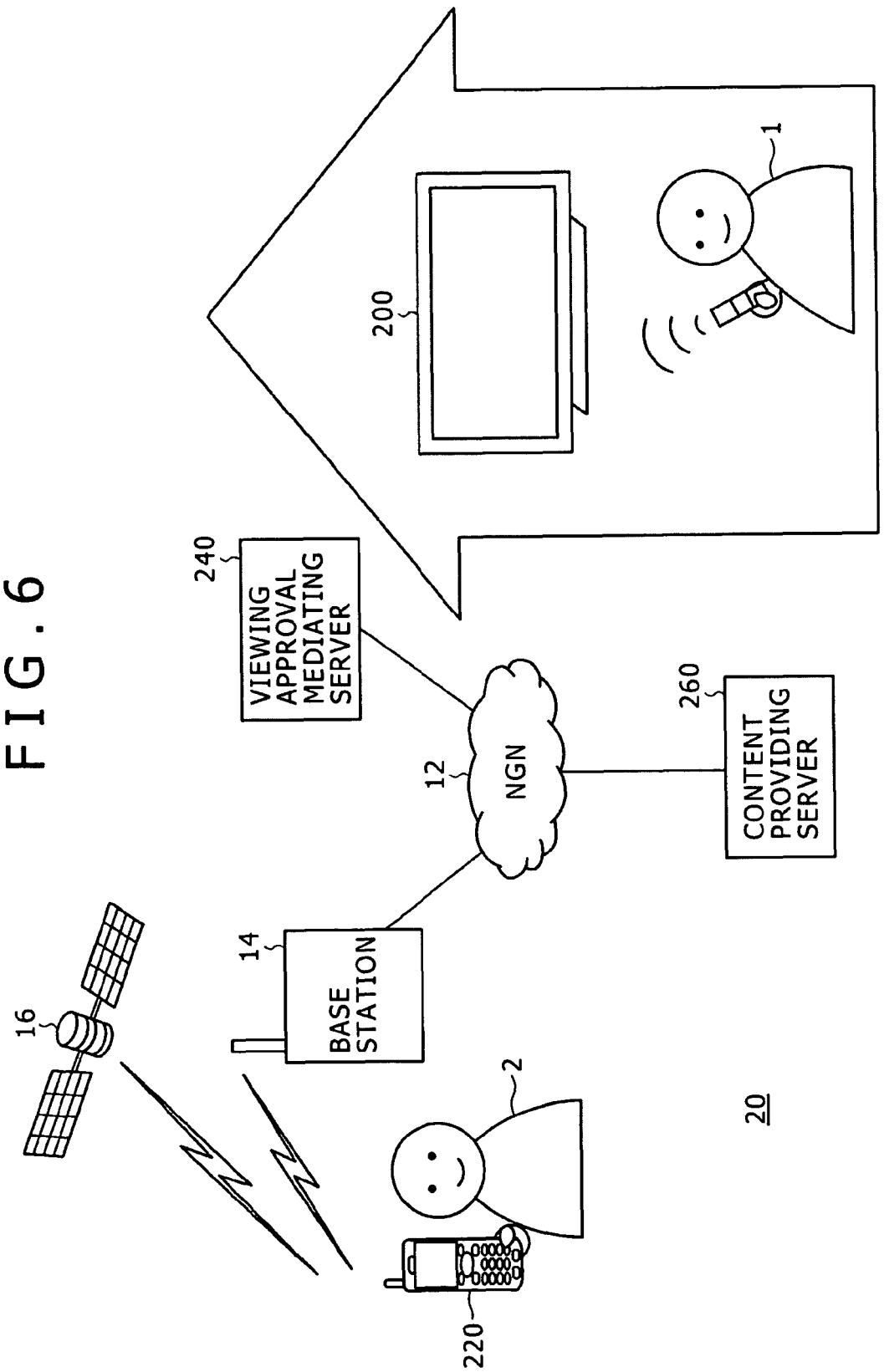
FIG. 6 is a schematic block diagram illustrating the configuration of a content viewing system according to a second embodiment of the present invention.

Next, a content viewing system 20 according to a second embodiment of the present invention will be described below with reference to FIG. 6. FIG. 6 is a schematic block diagram illustrating the configuration of the content viewing system 20 according to the second embodiment of the present invention.

In the above-described first embodiment, the parental control is achieved mainly through the communication between the content viewing terminal and the viewing approval terminal. Meanwhile, the content viewing system according to the second embodiment as described below is characterized in that a viewing approval mediating server that mediates the approval process for the viewing of the content intermediates between the content viewing terminal and the viewing approval terminal.

As shown in FIG. 6, the content viewing system 20 according to the second embodiment includes a content viewing apparatus 200, a viewing approval apparatus 220, a viewing approval mediating server 240, and a content providing server 260. These devices will now be described below with reference to FIG. 6.

(Content Viewing Apparatus 200)

The content viewing apparatus 200 according to the present embodiment is similar to the content viewing apparatus 100 according to the first embodiment, but different therefrom in the following respects. In the first embodiment, the content viewing control section 101 determines whether or not to issue the request for the viewing approval for the content. In contrast, in the present embodiment, the content providing server 260, which provides the content, determines whether or not the request for the viewing approval for the content needs to be issued, and when the viewing approval is required, this fact is notified from the content providing server 260 to the content viewing apparatus 200. The content viewing apparatus 200 issues the viewing approval request if the viewing approval is requested by the content providing server 260.

The content viewing apparatus 200 transmits, to the viewing approval mediating server 240, the viewing approval request to be issued to the viewing approval apparatus 220, and receives the approval/disapproval response from the viewing approval mediating server 240. When the viewing approval has been granted, the notification about the approval/disapproval response is provided from the viewing approval mediating server 240 to the content providing server 260, and the content viewing apparatus 200 becomes able to access the content providing server 260 after receiving the approval/disapproval response from the viewing approval mediating server 240. The above applies to both the case where the content to be viewed is downloaded from the content providing server 260 to the content viewing apparatus 200 and the case where the content to be viewed is stored in the content viewing apparatus 200 or a storage medium connected to the content viewing apparatus 200.

(Viewing Approval Apparatus 220)

The viewing approval apparatus 220 according to the present embodiment is similar to the viewing approval apparatus 120 according to the first embodiment, but different therefrom in that the viewing approval apparatus 220 receives the viewing approval request from the viewing approval mediating server 240 and transmits the approval/disapproval response to the viewing approval mediating server 240. The differences of the viewing approval apparatus 220 from the viewing approval apparatus 120 according to the first embodiment will now be described below.

In the first embodiment, the viewing approval request is notified to the viewing approval apparatus 120 by using the SIP NOTIFY method. In contrast, in the present embodiment, the viewing approval request is notified from the viewing approval mediating server 240 to the viewing approval apparatus 220 by using an electronic mail or a MESSAGE method. The viewing approval process is performed via a website designed for viewing approval (hereinafter referred to as a "viewing approval-use website"), which is provided by the viewing approval mediating server 240, and a URL of the viewing approval-use website is notified to the viewing approval apparatus 220. When notified to the viewing approval apparatus 220, the URL of the viewing approval-use website is included in the electronic mail or the MESSAGE method. The viewing approval party 2 uses the viewing approval-use website displayed on a web browser to perform the viewing approval process, and the approval/disapproval response is transmitted to the viewing approval mediating server 240 using HTTP or HTTPS.

(Viewing Approval Mediating Server 240)

The viewing approval mediating server 240 is a server that mediates the viewing approval process between the content viewing apparatus 200 and the viewing approval apparatus 220. In addition, the viewing approval mediating server 240 provides the viewing approval-use website designed for the viewing approval to the viewing approval apparatus 220.

Upon receipt of the viewing approval request from the content viewing apparatus 200, the viewing approval mediating server 240 notifies the viewing approval apparatus 220 of the viewing approval request. The viewing approval mediating server 240 may generate an electronic mail that contains information such as the name or type of the content and the ID of the viewing requesting party 1, of which the viewing approval mediating server 240 has been notified by the content viewing apparatus 200, and the URL of the viewing approval-use website, and transmit the generated electronic mail to a mail address that has previously been registered by the viewing approval party 2. Alternatively, the viewing approval mediating server 240 may transmit the MESSAGE method that contains the above information to the viewing approval apparatus 220.

If, after the transmission of the viewing approval request, the approval/disapproval response is transmitted from the viewing approval apparatus 220 to the viewing approval mediating server 240 via the viewing approval-use website, the viewing approval mediating server 240 transmits the approval/disapproval response to the content viewing apparatus 200 by using the INFO method or the like. In the case where the viewing of the content has been permitted as a result of the approval process, the viewing approval mediating server 240 notifies the content providing server 260 of information such as an ID of the content, the ID of the viewing requesting party 1, and an ID of a user to whom the fee is charged, thereby notifying the content providing server 260 of completion of the viewing approval.

(Content Providing Server 260)

The content providing server 260 is a server for providing the content to the content viewing apparatus 200.

If the content providing server 260 receives the request for the content from the content viewing apparatus 200, the content providing server 260 determines whether or not the viewing approval is necessary before providing the content, based on the ID of the viewing requesting party 1 who has made the request for the content, the attribute of the content, or the like. If it is determined that the viewing approval is necessary, the content providing server 260 notifies the content viewing apparatus 200 of this fact.

If the viewing approval is granted in the viewing approval apparatus 220, the information such as the ID of the content to be viewed, the ID of the viewing requesting party 1 for whom the viewing of the content has been permitted, and the ID of the user to whom the fee is charged is notified from the viewing approval mediating server 240 to the content providing server 260. If a viewing request that matches the received information is made, the content providing server 260 provides the content in question to the content viewing apparatus 200. If the content for which the viewing request has been made is stored in the content viewing apparatus 200 or the storage medium connected to the content viewing apparatus 200, the content apparatus 200 issues a request for use of that content to the content providing server 260, and the content providing server 260 gives permission of using the content in question to the content apparatus 200.

The structure of the content viewing system 20 according to the present embodiment has been described above.

Next, with reference to FIG. 7, a flow of a procedure performed in the content viewing system 20 according to the present embodiment will now be described below. FIG. 7 is a sequence diagram illustrating an exemplary flow of the viewing approval process performed in the content viewing system 20, specifically a flow of a procedure in the case where the viewing requesting party 1 downloads a content provided by the content providing server 260 and views the downloaded content with the content viewing apparatus 200.

First, at step S400, the content viewing apparatus 200 uses the INFO method to make a request for use of the content provided by the content providing server 260. The content providing server 260 determines whether or not the viewing approval is necessary based on the ID of the viewing requesting party 1 who has requested the content, the attribute of the content, and so on, and at step S402, the content providing server 260 sends an authentication request to the content viewing apparatus 200 by using the INFO method.

The content viewing apparatus 200 allows the display section to display a screen for selecting whether or not to send the viewing approval request, thereby allowing the viewing requesting party 1 to decide whether or not to send the viewing approval request. If the viewing requesting party 1 decides to make the viewing approval request, the content viewing apparatus 200, at step S404, transmits the viewing approval request to the viewing approval mediating server 240 by using the INFO method. Meanwhile, if the viewing requesting party 1 decides not to make the viewing approval request, this procedure is finished.

At step S406, the viewing approval mediating server 240 either generates the electronic mail that contains the information such as the name or type of the content and the ID of the viewing requesting party 1, which are included in the received viewing approval request, and the URL of the viewing approval-use website, and transmits the generated electronic mail to the mail address that has previously been registered by the viewing approval party 2, or transmits the MESSAGE method that contains the above information to the viewing approval apparatus 220.

At step S408, the viewing approval apparatus 220 receives the electronic mail- or the MESSAGE method transmitted by the viewing approval mediating server 240, and extracts the URL of the viewing approval-use website from a body of the electronic mail or the MESSAGE method, and uses the URL to access the viewing approval-use website. At step S410, the viewing approval party 2 uses the viewing approval-use website displayed on the web browser or the like to enter the approval/disapproval response. At step S412, the viewing approval apparatus 220 transmits the approval/disapproval response to the viewing approval mediating server 240 using HTTP, HTTPS, or other protocols.

In the case where the viewing of the content has been permitted at the viewing approval apparatus 220, the viewing approval mediating server 240 performs a use authentication process at step S414, by transmitting to the content providing server 260 the information such as the ID of the content to be viewed, the ID of the viewing requesting party 1 for whom the viewing of the content has been permitted, and the ID of the user to whom the fee is charged. In addition, at step S416, the viewing approval mediating server 240 notifies the content viewing apparatus 200 of the approval/disapproval response. Note that the processes of steps S414 and S416 may be performed in inverse order. Also note that the processes of steps S414 and S416 may be performed at the same time. Meanwhile, in the case where the viewing of the content has not been permitted at the viewing approval apparatus 220, the process of step S414 is omitted, and the content viewing apparatus 200 is notified of the approval/disapproval response at step S416. Thereafter, the approval/disapproval response is displayed at the content viewing apparatus 200, and this procedure is finished.

Next, at step S418, the content viewing apparatus 200, which has been notified of the permission for the viewing of the content, transmits the request for the use of the content to the content providing server 260 by using the INFO method. The content providing server 260 determines that the use of the content has been approved based on the information transmitted from the viewing approval mediating server 240 at step S414, and transmits the content to the content viewing apparatus 200 at step S420. At step S422, the content viewing apparatus 200 receives the content from the content providing server 260 and allows the display section to display the played video or the like.

Next, with reference to FIG. 8, a flow of another procedure performed in the content viewing system 20 according to the present embodiment will now be described below. FIG. 8 is a sequence diagram illustrating an exemplary flow of another viewing approval process performed in the content viewing system 20, specifically a flow of a procedure in the case where a content (i.e., a local content) that had been acquired from the content providing server 260 and stored in the content viewing apparatus 200 or the like is viewed.

First, the content viewing apparatus 200 selects a content to be viewed from among local contents at step S430, and at step S432, a request for use of that content is transmitted to the content providing server 260. Similarly to the process of step S402 as shown in FIG. 7, the content providing server 260 sends the authentication request to the local content by using the INFO method at step S434. At step S436, the authentication request is transmitted from the local content to the content viewing apparatus 200.

Processes of steps S438, S440, S442, S444, S446, and S448 are significantly the same as those of the steps S404 to S414 as shown in FIG. 7, and descriptions thereof will be omitted here. At step S450, the viewing approval mediating server 240 provides, to the content viewing apparatus 200, information such as an authentication key required for using the content, thereby notifying the content viewing apparatus 200 of the approval for the viewing of the content.

At step S452, the content viewing apparatus 200 selects the local content in question for viewing, and at step S454, transmits the authentication key required for using the content to the content providing server 260, thereby transmitting the request for the use of the content. At step S456, the content providing server 260 permits the use of the local content by using the authentication key, and at step S460, the content viewing apparatus 200 plays the local content to allow the display section to display the played video or the like.

The preferred embodiments of the present invention have been described above with reference to the accompanying drawings. It will be appreciated that the present invention is not limited to the above-described preferred embodiments. It should be understood by those skilled in the art that various modifications, combinations, sub-combinations and alterations may occur depending on design requirements and other factors insofar as they are within the scope of the appended claims or the equivalents thereof.

What is claimed is:

1. A content viewing system, comprising:
    a content viewing apparatus used for viewing a content; and
    a viewing approval apparatus that is a portable communication apparatus used by a viewing approval party to perform an approval process, the viewing approval party having authority to approve viewing of the content, wherein
    said content viewing apparatus includes
        a viewing approval requesting section configured to transmit a viewing approval request to said viewing approval apparatus when it has been determined that approval for the viewing of the content, the viewing of which has been requested, is necessary, and
        a content viewing control section configured to receive, from said viewing approval apparatus, an approval/disapproval response to the viewing approval request, and, if the approval/disapproval response indicates that the viewing of the content has been approved, enable the viewing of the content, and
    said viewing approval apparatus includes
        an output section configured to output information concerning the viewing approval request received from said content viewing apparatus,
        an input section configured to accept input of the approval/disapproval response to the viewing approval request, and
        an approval/disapproval response notification section configured to notify said content viewing apparatus of the approval/disapproval response inputted via the input section;
    wherein
        said content viewing apparatus further includes an approval party status acquisition section configured to acquire, from said viewing approval apparatus, an approval party status that indicates whether or not the viewing approval request needs to be made to the viewing approval party;
        said viewing approval apparatus further includes an approval party status notification section configured to determine the approval party status based on a current location of said viewing approval apparatus, and notify said content viewing apparatus of the approval party status; and
        the viewing approval requesting section of said content viewing apparatus decides whether or not to transmit the viewing approval request, based on the approval party status.

2. The content viewing system according to claim 1, wherein the approval party status notification section of said viewing approval apparatus determines that the viewing approval request does not need to be made to the viewing approval party, if the current location of said viewing approval apparatus is within a predetermined area.

3. The content viewing system according to claim 1, wherein
    the approval party status notification section of said viewing approval apparatus provides, to said content viewing apparatus, information representing the current location of said viewing approval apparatus, and
    the viewing approval requesting section of said content viewing apparatus decides whether or not to transmit the viewing approval request, based on the information representing the current location of said viewing approval apparatus.

4. The content viewing system according to claim 1, wherein said viewing approval apparatus further includes
    a voice communication control section configured to transmit, to said content viewing apparatus, a request for starting a session to carry out voice communication with said content viewing apparatus, when the viewing approval request has been received.

5. The content viewing system according to claim 1, further comprising
    a location server configured to manage information about locations of said content viewing apparatus and said viewing approval apparatus on a network, wherein
    said location server acquires the information about the location of said viewing approval apparatus on the network to forward the viewing approval request received from said content viewing apparatus to said viewing approval apparatus, and said location server acquires the information about the location of said content viewing apparatus on the network to forward the approval/disapproval response received from said viewing approval apparatus to said content viewing apparatus.

6. The content viewing system according to claim 1, further comprising
a viewing approval mediating server configured to mediate a viewing approval process for the content between said content viewing apparatus and said viewing approval apparatus, wherein
upon receipt of the viewing approval request transmitted from said content viewing apparatus, said viewing approval mediating server notifies said viewing approval apparatus of an access destination of a website provided for the viewing approval process, and
said viewing approval apparatus accesses the website by using the access destination to perform the viewing approval process and transmit the approval/disapproval response to said viewing approval mediating server.

7. The content viewing system according to claim 6, wherein when the viewing of the content has been approved in said viewing approval apparatus, said viewing approval mediating server notifies a source that provides the content that the viewing of the content has been approved.

8. The content viewing system according to claim 6, wherein when the viewing of the content has been approved in said viewing approval apparatus, said viewing approval mediating server transmits, to said content viewing apparatus, secret information for enabling the viewing of the content.

9. A content viewing apparatus used for viewing a content, comprising:
a viewing approval requesting section configured to transmit a viewing approval request to a viewing approval apparatus when it has been determined that approval for viewing of the content, the viewing of which has been requested, is necessary, the viewing approval apparatus being a portable communication apparatus used by a viewing approval party to perform an approval process, the viewing approval party having authority to approve the viewing of the content;
a content viewing control section configured to receive, from the viewing approval apparatus, an approval/disapproval response to the viewing approval request, and, if the approval/disapproval response indicates that the viewing of the content has been approved, enable the viewing of the content; and
an approval party status acquisition section configured to acquire, from the viewing approval apparatus, an approval party status that indicates whether or not the viewing approval request needs to be made to the viewing approval party,
wherein
said viewing approval requesting section decides whether or not to transmit the viewing approval request, based on the acquired approval party status; and said viewing approval requesting section receives, from the viewing approval apparatus, information representing a current location of the viewing approval apparatus, and, if the current location of the viewing approval apparatus is within a predetermined area, does not transmit the viewing approval request.

10. The content viewing apparatus according to claim 9, further comprising
a voice communication control section configured to receive, from the viewing approval apparatus, a request for starting a voice communication session, and control voice communication performed between the content viewing apparatus and the viewing approval apparatus.

11. A viewing approval apparatus that is a portable communication apparatus used by a viewing approval party to perform an approval process, the viewing approval party having authority to approve viewing of a content, the viewing approval apparatus comprising:
an output section configured to output information concerning a viewing approval request with respect to a given content, the viewing approval request being received from a content viewing apparatus used for viewing the content;
an input section configured to accept input of an approval/disapproval response to the viewing approval request;
an approval/disapproval response notification section configured to notify the content viewing apparatus of the approval/disapproval response inputted via said input section; and
an approval party status notification section configured to determine an approval party status that indicates whether or not the viewing approval request needs to be made to the viewing approval party based on a current location of the viewing approval apparatus, and notify the content viewing apparatus of the approval party status.

12. The viewing approval apparatus according to claim 11, wherein said approval party status notification section determines that the viewing approval request does not need to be made to the viewing approval party, if the current location of the viewing approval apparatus is within a predetermined area.

13. The viewing approval apparatus according to claim 11, wherein said approval party status notification section notifies the content viewing apparatus of the current location of the viewing approval apparatus.

14. The viewing approval apparatus according to claim 11, further comprising
a voice communication control section configured to transmit, to the content viewing apparatus, a request for starting a session to carry out voice communication with the content viewing apparatus, when the viewing approval request has been received.

* * * * *